March 17, 1959 — E. DI GIACOMO — 2,877,912
WHEEL MOUNTING TOOL
Filed May 8, 1958

INVENTOR.
ERASMUS DI GIACOMO
BY George Spector
AGENT

United States Patent Office 2,877,912
Patented Mar. 17, 1959

2,877,912

WHEEL MOUNTING TOOL

Erasmus Di Giacomo, Brooklyn, N. Y.

Application May 8, 1958, Serial No. 733,985

2 Claims. (Cl. 214—332)

This invention relates to a means for facilitating the remounting of automobile tires.

Almost every motorist has found himself faced with the problem of having to remount a tire. At best it can be described as a dirty and messy job. The motorist is forced to lift by hand the tire off the ground while at the same time he must line up the holes on the rim of the tire with the proper lugs on the shaft. If the motorist has steady hands, a good eye and infinite endurance he will finally succeed in remounting the tire. The motorist, most probably, will also have succeeded in dirtying his hands and soiling the front of his suit or shirt.

Consequently the primary object of this invention in its broadest aspect is the provision of means for facilitating the remounting of an automobile tire.

Another object of this invention is to provide clean, fast and efficient means for the remounting of an automobile tire.

A further object of this invention is to provide a portable device for the remounting of an automobile tire which may be easily stored in the trunk compartment of the automobile.

A still further object of this invention is to provide a device for the remounting of an automobile tire which can be used for any size automobile tire.

Figure 1:
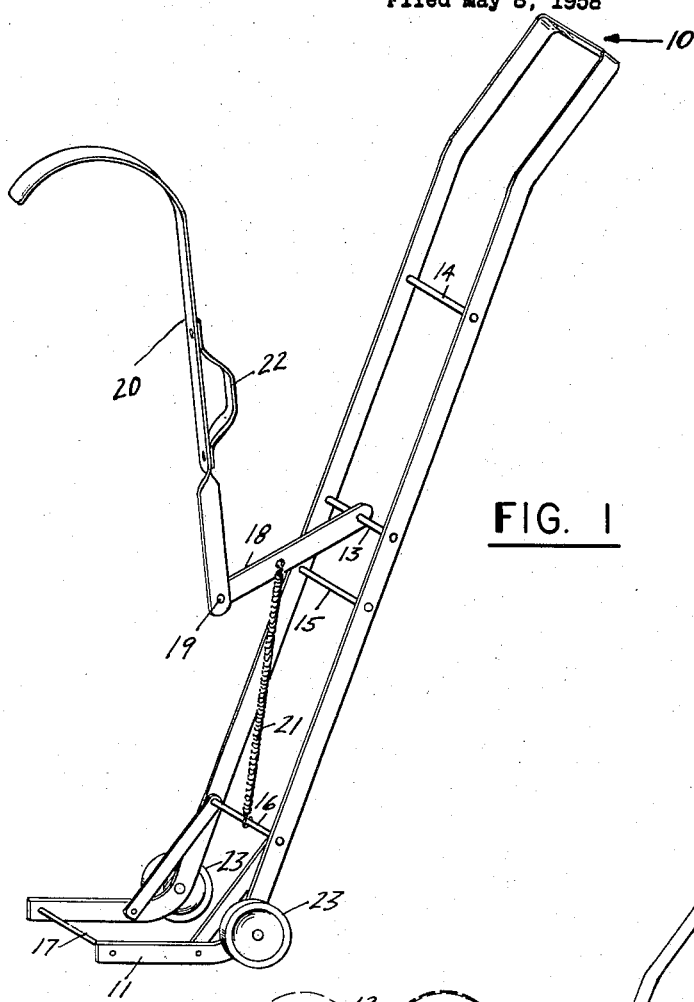

Further objects and inventive details of this invention will become more apparent from the following detailed description, appended claims and attached drawings in which:

Figure 1 shows the invention in its preferred embodiment.

Figure 2:
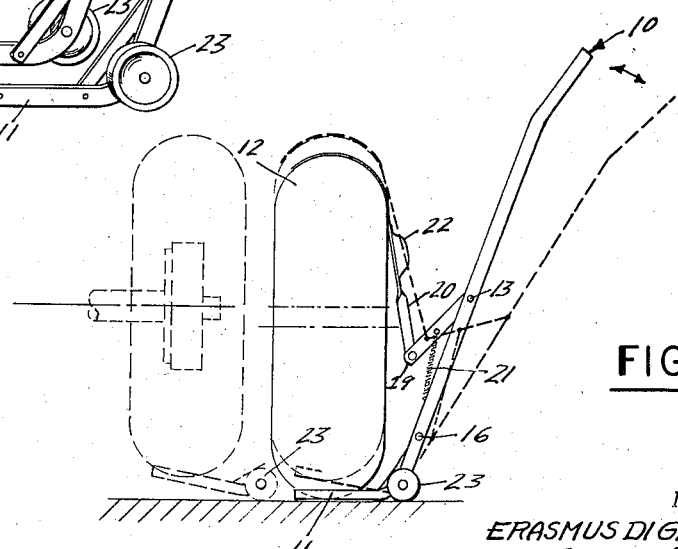

Figure 2 shows three different positions incurred during the remounting of the automobile tire. The first position shows the tire on the invention's platform (this position is indicated by the solid lines). The second shows the tire raised and alined with the lugs on the shaft (this position is indicated by the dashed lines). The third shows the tire after it has been remounted.

Referring now to Figure 1 the simplicity of the invention can be seen. The frame 10 has been shaped so that its bottom portion can double as a platform 11 for the tire 12. Holes have been provided in the frame 10 to allow for stiffener rods 13, 14, 15, 16 and 17. Stiffener rod 13 passes through a hole in the link arm 18. The link arm 18 is connected by the link 19 to the holding arm 20. A spring 21 is attached to the link arm 18 and stiffener rod 16. A handle 22 is attached to the holding arm 20. Wheels 23 are provided to make the invention movable. To operate the motorist first planes the tire 12 upon the platform 11. The holding arm 20 is placed over the top of the tire 12. The spring 21 holds the holding arm 20 taut against the tire. The motorist places one hand on the frame top 10 and the other on the handle 22. Tilting the frame 10 backwards causes the tire 12 to rise. The motorist continues to tilt the frame 10 until tire is alined with the lugs. To keep the tire vertical the motorist pushes forward on the handle 22. When the tire is both vertical and alined all the motorist must now do is roll the frame 10 forward until the lugs on the shaft have passed through the holes in the tire's rim. The motorist now lifts up the holding arm 20, tilts the frame 10 forward and rolls the frame from underneath the tire. The bolts are then tightened over the lugs and the tire has been remounted.

When the invention is not in use it can be easily stored in the trunk compartment of the motorist's vehicle.

It should be noted that the embodiments disclosed herein are merely preferred forms of practicing the invention, and that many variations can be devised by one skilled in the art without departing from the inventive scope.

A grant of Letters Patent is desired for the invention as defined in the following claims:

1. A tool for facilitating the mounting of a wheel on the axle of a vehicle, comprising an L-shaped frame having an upstanding leg adapted for manual actuation at its upper end and an outstanding leg projecting at the base of the frame substantially at right angles from the upstanding leg, including rollers pivotally mounted on the frame about an axis transverse to the longitudinal axis of the frame disposed at the intersection of the said legs whereby the frame is fulcrumed on the roller axis of rotation at the juncture of the legs, in combination with an arm pivoted at one end to the upstanding leg between the rollers and the upper end, in further combination with a securing grapple pivotally secured at its inner end to the said arm and having an arcuate shaped outer end adapted to engage the surface of a vehicular tire for the purpose of pivoting the wheel upon which the tire is mounted about an axis transverse to the wheel axis, said securing grapple having a handle disposed between the outer and inner ends, in still further combination with a spring secured to both the said arm and the upstanding leg biasing the arm towards the said frame, said outstanding leg including a cradle adapted to receive the tire surface at a location substantially diametrically opposite the area of the tire surface engaged by the grapple, said tire surfaces being disposed generally parallel to the wheel axis, whereby the grapple is adapted to adjustably pivot the wheel about its area of engagement with the cradle to maintain the wheel vertical in all positions of the frame relative to the vertical position.

2. A tool as in claim 1 wherein the said cradle is positioned below the roller axis, parallel and in contact with the ground when the frame has been tilted about the rollers to receive a wheel thereon.

References Cited in the file of this patent

UNITED STATES PATENTS

| | | |
|---|---|---|
| 590,436 | Marvel | Sept. 21, 1897 |
| 990,936 | West | May 2, 1911 |
| 1,892,979 | Clark | Jan. 3, 1933 |
| 2,447,435 | Settle | Aug. 17, 1948 |
| 2,797,005 | Prewett | June 25, 1957 |